United States Patent [19]

Bartkowiak

[11] Patent Number: 5,732,251
[45] Date of Patent: Mar. 24, 1998

[54] DSP WITH REGISTER FILE AND MULTI-FUNCTION INSTRUCTION SEQUENCER FOR VECTOR PROCESSING BY MACU

[75] Inventor: John G. Bartkowiak, Austin, Tex.

[73] Assignee: Advanced Micro Devices, Sunnyvale, Calif.

[21] Appl. No.: 643,342

[22] Filed: May 6, 1996

[51] Int. Cl.$^6$ .................................................. G06F 17/10
[52] U.S. Cl. .......................... 395/562; 364/736; 364/754; 364/750.5; 364/715.01; 395/563
[58] Field of Search .............................. 364/736, 754, 364/758, 715.01, 602, 750.5; 395/562, 564, 800, 563

[56] References Cited

U.S. PATENT DOCUMENTS

| | | | |
|---|---|---|---|
| 4,791,555 | 12/1988 | Garcia et al. | 395/800 |
| 5,175,863 | 12/1992 | Jones, Jr. | 395/800 |
| 5,179,530 | 1/1993 | Genusov et al. | 364/736.03 |
| 5,311,458 | 5/1994 | Haines et al. | 364/750.5 |
| 5,517,436 | 5/1996 | Andreas et al. | 264/736.04 |
| 5,611,075 | 3/1997 | Garde | 395/480 |

FOREIGN PATENT DOCUMENTS 0 425 410  5/1991  European Pat. Off. .

OTHER PUBLICATIONS

"PowerPC 601 RISC Microprocessor User's Manual," 1993, pp. 1-3 to 1-8.
"PowerPC 604 RISC Microprocessor User's Manual," 1994, pp. 1-7 to 1-18.
Lemmens, L., "Digital Signal Processors," Elektor Electronics, vol. 21, No. 231, Mar. 1, 1995, pp. 24–25.

*Primary Examiner*—Kenneth S. Kim
*Attorney, Agent, or Firm*—Conley, Rose & Tayon; B. Noel Kivlin

[57] ABSTRACT

A DSP including a register file connected to data memories and functional units is provided. Functional units read operands from the register file and store results into the register file. Various register storage locations form communicative links between the functional units and the memories, in accordance with a particular code sequence being executed by the DSP. Because each functional unit has an independent path to the register file, each functional unit may provide results to the register file concurrently. Additionally, having multiple register storage locations which are accessible to any functional unit permits flexibility in the operation of the DSP. Multiple register storage locations may be used by the same functional unit, allowing program code to be more optimized by storing values for later use in one of the register storage locations, as opposed to storing values in the data memories. The register file essentially provides a buffer between the functional units, and between the functional units and memory.

5 Claims, 8 Drawing Sheets

DSP WITH REGISTER FILE AND MULTI-FUNCTION INSTRUCTION SEQUENCER FOR VECTOR PROCESSING BY MACU

BACKGROUND OF THE INVENTION

1. Field of the Invention

This invention relates to the field of digital signal processors (DSPs) and, more particularly, to interfacing multiple memories and multiple functional units within DSPs.

2. Description of the Relevant Art

Computer systems employ one or more microprocessors, and often employ digital signal processors (DSPs). The DSPs are typically included within multimedia devices such as sound cards, speech recognition cards, video capture cards, etc. The DSPs function as coprocessors, performing complex and repetitive mathematical computations demanded by multimedia devices and other signal processing applications more efficiently than general purpose microprocessors. Microprocessors are typically optimized for performing integer operations upon values stored within a main memory of a computer system. While DSPs perform many of the multimedia functions, the microprocessor manages the operation of the computer system.

A digital signal processor is essentially a microprocessor which includes special hardware for executing complex mathematical functions at speeds and efficiencies not usually associated with microprocessors. Digital signal processors include execution units which comprise one or more arithmetic/logic units (ALUs) coupled to hardware multipliers which implement complex mathematical algorithms in a pipelined manner. The instruction set primarily comprises DSP-type instructions (i.e. instructions optimized for the performance of complex mathematical operations) and also includes a small number of non-DSP instructions. The non-DSP instructions are in many ways similar to instructions executed by microprocessors, and are necessary for allowing the DSP to function independent of the microprocessor.

The DSP is typically optimized for mathematical algorithms such as correlation, convolution, finite impulse response (FIR) filters, infinite impulse response (IIR) filters, Fast Fourier Transforms (FFTs), matrix computations, and inner products, among other operations. Implementations of these mathematical algorithms generally comprise long sequences of systematic arithmetic/multiplicative operations. These operations are interrupted on various occasions by decision-type commands. In general, the DSP sequences are a repetition of a very small set of instructions that are executed 70% to 90% of the time. The remaining 10% to 30% of the instructions are primarily boolean/decision operations. An exemplary DSP is the ADSP 2171 available from Analog Devices, Inc. of Norwood, Mass.

Figure 1:
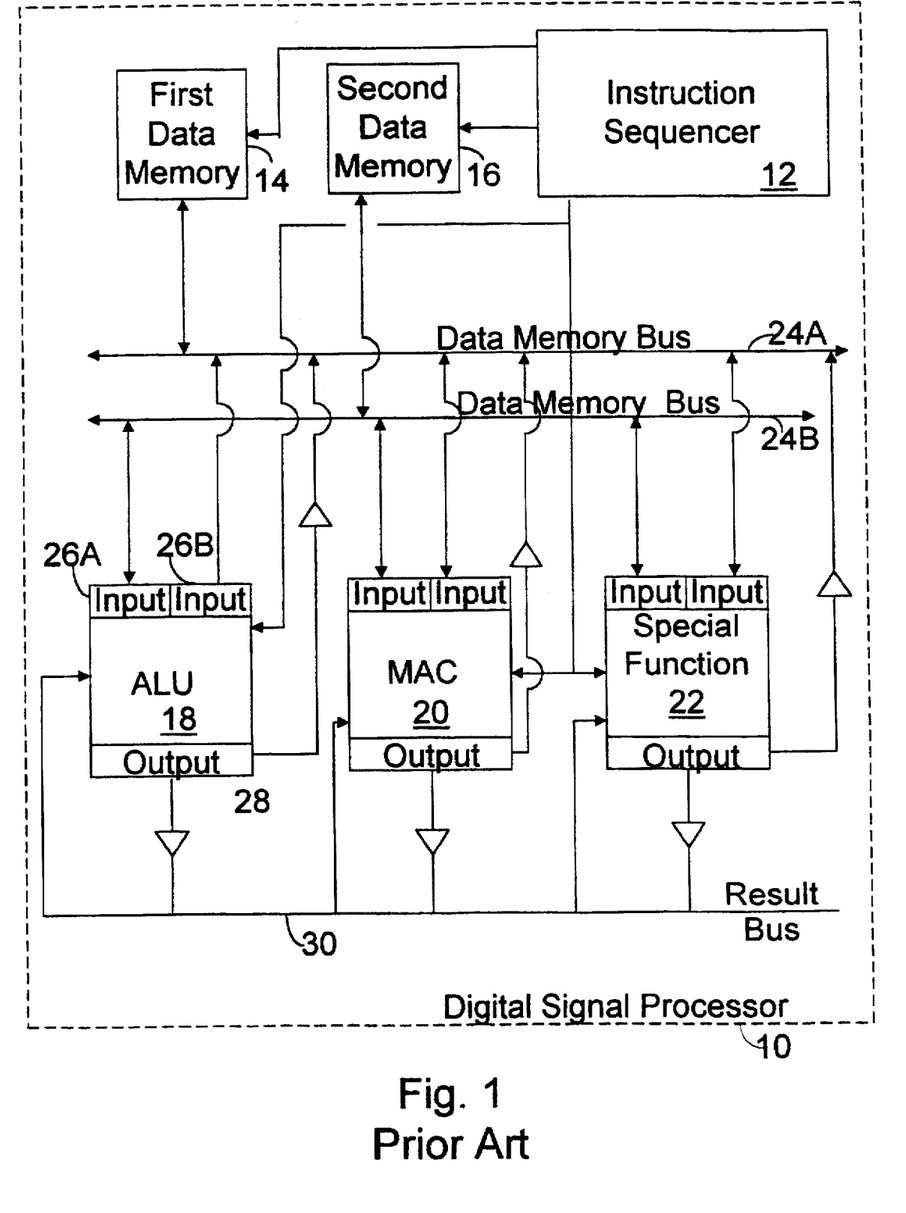
FIG. 1 is a block diagram of a conventional DSP.

FIG. 1 is a block diagram of a conventional DSP 10. DSP 10 includes an instruction sequencer 12, a first data memory 14, a second data memory 16, an ALU 18, a multiply and accumulate (MAC) unit 20, and a special functional unit 22. It is noted that additional functional units may be included as well. ALU 18, MAC unit 20, and special functional unit 22 are examples of functional units. As used herein, a "functional unit" is a block of circuitry configured to perform at least one instruction operation. A functional unit may be configured to perform more than one instruction operation. As used herein, an instruction operation is an operation (e.g. arithmetic, logical, and data movement operations) specified by the instructions within the instruction set of the DSP. The operation specifies a specific manipulation to be performed upon one or more input operands, producing a result. For example, ALU 18 is configured to perform arithmetic and logical operations upon input operands to produce a result. MAC unit 20 is configured to multiply input operands and accumulate the result in an internal accumulator. The DSP includes functionality within at least one of its functional units for performing each instruction operation specified within the instruction set. A particular instruction may specify one or more instruction operations.

The instruction operation (or operations) performed during a given clock cycle is selected according to the instructions being executed. The instructions are typically pipelined, such that instruction execution may be overlapped. Instruction sequencer 12 is responsible for retrieving instructions from an instruction storage (for example, a random access memory (RAM) or read-only memory (ROM)) within instruction sequencer 12. Instruction operations corresponding to the instruction are communicated to appropriate units via control signals. The instruction may be pipelined, such that control signals are asserted during consecutive clock cycles in response to a particular instruction. Instruction sequencer 12 may be responsible for detecting dependencies between instructions (both for functional units and instruction results) to ensure proper operation of DSP 10. As used herein, a control signal is a value comprising one or more bits conveyed upon conductors coupled between two or more blocks of circuitry.

Operands for instruction operations are transferred from first data memory 14 and second data memory 16 to the appropriate functional unit via a pair of data memory buses 24A and 24B. An input register (such as input registers 26A and 26B within ALU 18, coupled to data memory buses 24A and 24B, respectively) captures the value provided such that the corresponding functional unit may operate upon the operands in the succeeding clock cycle. The value generated is stored into an output register (such as output register 28). During a clock cycle subsequent to performance of the instruction operation, the result is driven from the output register upon a result bus 30. Typically, result bus 30 is shared between the functional units, such that at most one functional unit may drive a result during a particular clock cycle. Unfortunately, the limitation of one result per clock cycle causes decreased performance when the pipelined operation of instructions leads to results in more than one functional unit concurrently being ready for transfer upon result bus 30. One of the functional units must stall, awaiting a free cycle upon result bus 30 to transfer its result. Typically, the result which is produced first according to the sequential order of instructions is conveyed first, and a subsequent operation is stalled. Additionally, each functional unit may drive a result from its output register to first data memory 14 via data memory bus 24A (to which each functional unit's output register is coupled). Either data memory bus (and hence either data memory) may be used according to various embodiments of DSP 10. Unfortunately, a functional unit driving a result to first data memory 14 disallows transfer of an operand from first data memory 14 during the clock cycle that the result is driven. Once again, the pipeline of operations is stalled for a clock cycle to allow transfer of the result. Performance is deleteriously affected. The decreased performance occurs despite the otherwise independent nature of the operations. Since DSPs often operate upon real-time data, performance decreases are often more critical in DSPs than microprocessors. If a particular performance level (e.g. average number of instruction operations per cycle) cannot be achieved in a given application, the DSP may not be suitable for that application.

SUMMARY OF THE INVENTION

The problems outlined above are in large part solved by a DSP in accordance with the present invention. The DSP includes a register file connected to data memories and functional units. Functional units read operands from the register file and store results into the register file. Various register storage locations form communicative links between the functional units and the memories, in accordance with a particular code sequence being executed by the DSP. Because each functional unit has an independent path to the register file, each functional unit may provide results to the register file concurrently. Advantageously, pipeline stalls resulting from multiple functional units concurrently providing results are eliminated. Performance of the DSP may be increased to the degree that such pipeline stalls previously limited performance. In many cases, such as speech compression algorithms, an immense number of such pipeline stalls may be experienced. Performance may be substantially and adversely be affected in the absence of the DSP described herein.

Additionally, having multiple register storage locations which are accessible to any functional unit permits flexibility in the operation of the DSP. Multiple register storage locations may be used by the same functional unit, allowing program code to be more optimized by storing values for later use in one of the register storage locations, as opposed to storing values in the data memories. The register file essentially provides a buffer between the functional units, and between the functional units and memory. The buffer allows for more concurrent operation of the functional units and memory by providing storage locations and independent paths to those storage locations from the multiple functional units and memory. Allowing more concurrent activity generally results in higher performance levels, assuming appropriate instruction coding.

Broadly speaking, the present invention contemplates a digital signal processor comprising a plurality of functional units, a register file, and a plurality of memories. The functional units are each configured to perform at least one instruction operation. The register file includes a plurality of storage locations. Each of the storage locations is configured to store a value. The register file is coupled to provide a plurality of the values to each of the plurality of functional units, and is further coupled to receive a result from each of the functional units. The received results are stored into one of the storage locations. The memories are coupled to provide values to the register file for storage, and are further coupled to receive values from the register file for storage.

The present invention further contemplates a method for operating a register file. The method comprises several steps. A first value is stored into the register file. The first value is provided by a first memory in response to a first instruction operation. Similarly, a second value provided by a second memory is stored into the register file. The second value is provided by the second memory in response to the first instruction operation. The first value and second values are conveyed from the register file to a first functional unit in response to a second instruction operation. Additionally, the result from the first functional unit is stored in the register file.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
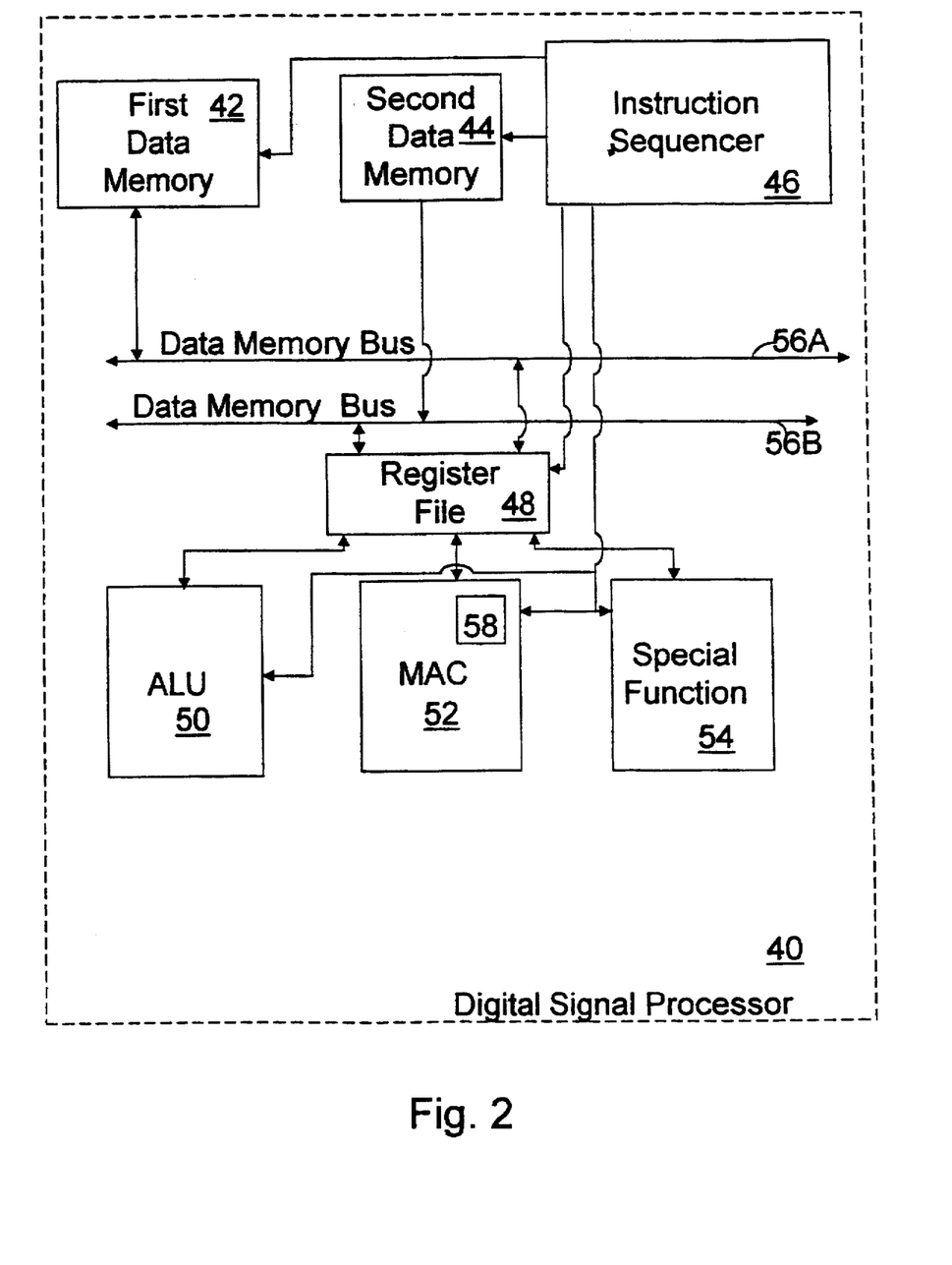
FIG. 2 is a block diagram of one embodiment of a DSP in accordance with the present invention.

Turning now to FIG. 2, a block diagram of one embodiment of a digital signal processor 40 in accordance with the present invention is shown. DSP 40 includes a first data memory 42, a second data memory 44, an instruction sequencer 46, a register file 48, an ALU 50, a MAC unit 52, and a special functional unit 54. ALU 50, MAC unit 52, and special functional unit 54 are examples of functional units. Additional functional units may be included within DSP 40 as well. Instruction sequencer 46 is coupled to first data memory 42, second data memory 44, register file 48, ALU 50, MAC unit 52, and special functional unit 54. First data memory 42, second data memory 44, and register file 48 are coupled to a pair of data memory buses 56A and 56B. Additionally, register file 48 is coupled to ALU 50, MAC unit 52, and special functional unit 54.

Generally speaking, register file 48 includes a plurality of register storage locations for storing data. The register storage locations may store operands, or may store results generated by the functional units. Additionally, first and second data memories 42 and 44 may provide data to be operated upon by the functional units. Register file 48 may store this data as well. According to the instructions being executed by DSP 40, various register storage locations may serve as communication elements between the functional units and first and second data memories 42 and 44. For example, different register storage locations may be assigned to transfer data between first and second data memories 42 and 44 and ALU 50 than are assigned to transfer data between ALU 50 and MAC unit 52. Although any number of storage locations may be included within register file 48, sixteen register storage locations may be included according to one embodiment. Each register storage location is identified by a number, referred to as a register address. Instructions detected by instruction sequencer 46 may specify register addresses for operands and for the result of the instruction.

Data memory buses 56 and the functional units of DSP 40 each have an individual connection to register file 48. Advantageously, each functional unit and data memories 42 and 44 may independently transfer data to and from register file 48 in response to control signals provided by instruction sequencer 46. Stalls in operand and result flow from the functional units and data memories 42 and 44 due to lack of communicative paths there between may be eliminated. Performance may be increased due to the lack of pipeline disruption experienced by DSP 40. DSP 40 may be suitable for applications for which it would not be suitable if stalls due to lack of communicative paths limited the performance of DSP 40. It is noted that certain functional units may be provided independent paths to register file 48 while other functional units may share a path, if the applications for which DSP 40 is optimized do not require concurrent propagation of results from the functional units which share a path.

First data memory 42 and second data memory 44 each comprises a plurality of storage locations for storing data. Control signals from instruction sequencer 46 include an address for uniquely identifying one of the storage locations to be accessed in a given clock cycle. Additionally, control signals identify the direction of transfer of data. A read transfer may be specified, in which data from the storage location is conveyed upon data memory buses 56. Alternatively, a write transfer may be specified. Write transfers involve storing data conveyed upon data memory buses 56 into the selected storage location. Still further, no transfer may be specified via control signals from instruction sequencer 46 if data memory is not accessed during a clock cycle. First data memory 42 employs data memory bus 56A for transfers to and from register file 48, while second data memory 44 employs data memory bus 56B for transfers to and from register file 48. It is noted that first data memory 42 and second data memory 44 may comprise RAM, ROM, or any other type of memory storage.

Each of the functional units receives operands from register file 48. Control signals asserted by instruction sequencer 46 to the functional units identify the instruction operation to be performed upon the received operands. The result produced is then conveyed back to register file 48 for storage. Preferably, each functional unit is configured to receive operands, compute a result, and convey the result to register file 48 for storage in a single clock cycle. However, other embodiments of DSP 40 are contemplated in which the functional units may be pipelined such that multiple clock cycles elapse during the performance of a particular instruction operation.

ALU 50 is configured to provide arithmetic and logical instruction operations. Arithmetic instruction operations may include addition and subtraction, among others. Logical instruction operations may include logical AND and logical OR, among others. Control signals from instruction sequencer 46 identify the specific arithmetic or logical function to be performed by ALU 50.

MAC unit 52 is configured to perform a multiply and accumulate function. Multiply and accumulate is a commonly employed instruction operation in signal processing applications, and hence a dedicated functional unit is often provided for performance of this function. Input operands are multiplied, producing a product. In one embodiment, a pair of input operands are provided for multiplication. The product is added to an accumulator register 58 included within MAC unit 52. MAC unit 52 may therefore not produce a result unless a particular control signal is asserted from instruction sequencer 46 causing the contents of accumulator register 58 to be copied to register file 48. Alternatively, MAC unit 52 may utilize one of the register storage locations within register file 48 as an accumulator register. For such an embodiment, input operands include the operands to be multiplied and the accumulated value to which the product should be added. MAC unit 52 may further be configured to produce, upon assertion of appropriate control signals from instruction sequencer 46, the product of the input operands instead of the accumulated sum of multiple products. In this manner, MAC unit 52 may be used to perform a multiplication.

Special functional unit 54 is included for performing a specific predetermined function upon assertion of appropriate control signals from instruction sequencer 46. The specific function may be a specialized arithmetic/logical operation which is often performed in the signal processing applications for which DSP 40 is optimized. For example, special functional unit 54 may be configured to compare one operand provided by register file 48 to another operand provided by register file 48. The operand which is numerically smaller may be returned as the result. The result may be stored in one of the registers providing the operand, such that multiple comparisons of operands result in the numerically smallest value of the operands being identified. Generally speaking, special functional unit 54 may be configured to perform any specific function in accordance with the applications for which DSP 40 is optimized. Other exemplary special functions may include:

(i) a lookup table or content-addressable memory (CAM) which stores predetermined values for comparison to values generated by DSP 40 or for other utilization by DSP 40;

(ii) an integer to floating point converter for converting integer values generated by DSP 40 into floating point values for cases in which the application for which DSP 40 is designed uses floating point values; or (iii) a particular logarithm function which is utilized in the algorithms for which DSP 40 is optimized. These examples are but a few of the myriad special functions which may be employed by DSP 40 within the spirit and scope of the present invention.

Register file 48 receives control signals from instruction sequencer 46 as well. The control signals include a register address for each register storage location accessed during the current clock cycle. For example, ALU 50 may receive two operands during a clock cycle and return one result. Control signals from instruction sequencer 46 would therefore include two ALU operand register addresses and one result register address. Additional control signals provide register addresses for operands and results of the other functional units, as well as register addresses and transfer directions for values from/to data memories 42 and 44.

Instruction sequencer 46 is configured to retrieve instructions from an instruction memory included therein and to assert control signals in response to the instructions to other portions of DSP 40. The instruction memory may be configured as any type of memory, including a RAM or ROM memory storage. Instruction sequencer 46 may additionally be configured to perform dependency checking between successive instructions to ensure that a value generated by one instruction and operated upon by a second instruction subsequent to that instruction is properly delivered to the second instruction. Still further, instruction sequencer 46 may include address generation circuitry for generating addresses for first and second data memories 42 and 44. The addresses are generated in accordance with the dictates of the instructions being executed. It is noted that instructions may specify instruction operations which are pipelined through two or more functional units. In such cases, instruction sequencer 46 includes circuitry for generating control signals in response to a particular instruction during several consecutive clock cycles.

According to one embodiment, exemplary instructions for DSP 40 may specify one or more of the following instruction operations:

(i) data movement between a register storage location and first data memory 42 or second data memory 44;

(ii) an arithmetic/logical operation using values from two register storage locations and storing the result in a register storage location;

(iii) a multiply and accumulate operation using two operands, the product to be accumulated by accumulator register 58;

(iv) a multiply operation using two operands, the product to be conveyed to register file 48; and (v) a special function performed by special functional unit 54. Additional instruction operations may be included as well. Often, an instruction will use an address for first data memory 42 and second data memory 44 which was generated by a previous instruction. Additionally, the instruction may modify the addresses stored in instruction sequencer 46 to generate new addresses for use by subsequent instructions.

Figure 3:
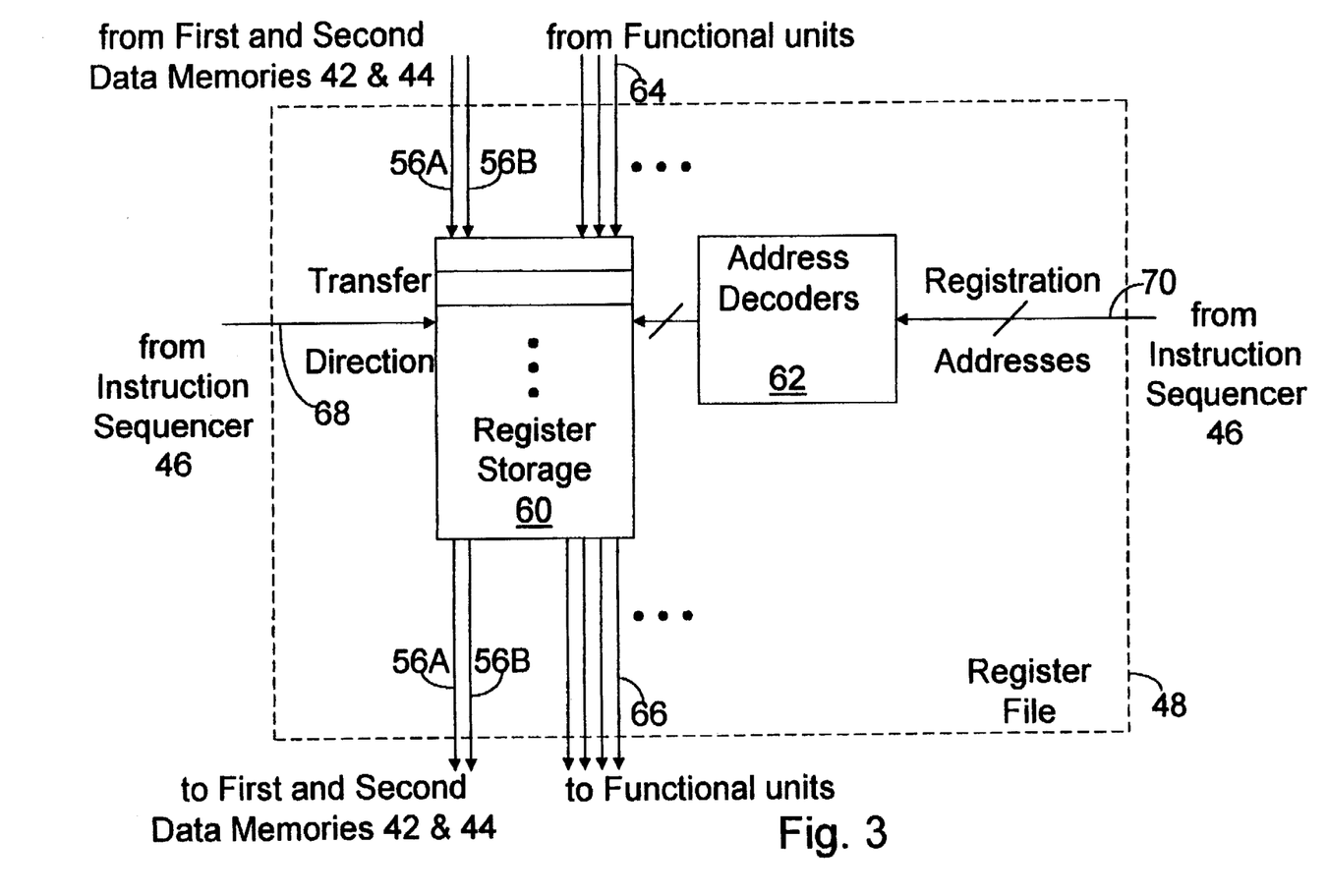
FIG. 3 is a block diagram of one embodiment of a register file shown in FIG. 2.

Turning now to FIG. 3, a block diagram of one embodiment of register file 48 is shown. Register file 48 includes a register storage 60 and an address decoder block 62. Register storage 60 is coupled to data memory buses 56, as well as a plurality of result data buses 64 and a plurality of operand data buses 66. Result data buses 64 and operand data buses 66 are coupled to various functional units. Additionally, a transfer direction bus 68 is coupled between instruction sequencer 46 and register storage 60. A plurality of register addresses are provided upon register addresses bus 70 from instruction sequencer 46 as well. Address decoder block 62 is coupled to register storage 60.

Register storage 60 includes at least one storage location per register included within DSP 40. Register storage 60 may comprise an array of RAM locations, or may comprise a plurality of individual storage circuits. Values stored within register storage 60 may be conveyed to first and second data memories 42 and 44 upon data memory buses 56. Additionally, values may be conveyed upon operand data buses 66 to the functional units within DSP 40. Similarly, data may be received for storage by register storage 60 upon data memory buses 56 (from first and second data memories 42 and 44) and result data buses 64. Since data memory buses 56 are used for both read and write data transfers from first and second data memories 42 and 44 to register file 48, instruction sequencer 46 indicates a transfer direction for each of data memory buses 56 upon transfer direction bus 68. For example, transfer direction bus 68 may include one signal per data memory bus 56. The signal may be asserted if the transfer of data is to register file 48 from the corresponding data memory. Conversely, the signal may be deasserted if the transfer of data is to the corresponding data memory from register file 48. Register storage 60 conveys a value for this embodiment on the corresponding data memory bus 56 if the control signal is deasserted, and receives a value if the control signal is asserted. The transfer direction for operand data buses 66 and result data buses 64 is implicit. Operand data buses 66 transfer operands from register file 48 to the functional units. Conversely, result data buses 64 transfer data from the functional units to register file 48.

Register file 48 conveys values upon data memory buses 56 and operand data buses 66 and receives values from data memory buses 56 and result data buses 64. The values are conveyed from and received into storage locations identified by register addresses conveyed by instruction sequencer 46 upon register addresses bus 70. According to one embodiment, one address is included for each of data memory buses 56, operand data buses 66, and result data buses 64. The register address identifies the register storage location within register storage 60 which is the source or destination of the corresponding data. Address decoder block 62 decodes each of the register addresses conveyed, producing control signals for register storage 60. The control signals cause register storage 60 to modify the storage location specified or convey data from the storage location specified upon the corresponding buses.

In one embodiment, register file 48 supports a read before write protocol to efficiently support pipelining of operations. In a read before write protocol, the value stored in a particular register storage location during a particular clock cycle is conveyed to receiving devices prior to writing a value into the particular register storage location during that particular clock cycle. The value written is received by register file 48 upon result data buses 64 and data memory buses 56. In this manner, data for a subsequent operation may be provided from first and second data memories 42 and 44 while the unit to perform the operation (e.g. ALU 50) operates upon the data currently stored within register file 48. During a subsequent clock cycle, ALU 50 may access the subsequent data from the same register storage locations, and first and second data memories 42 and 44 may provide yet subsequent data.

Figure 4:
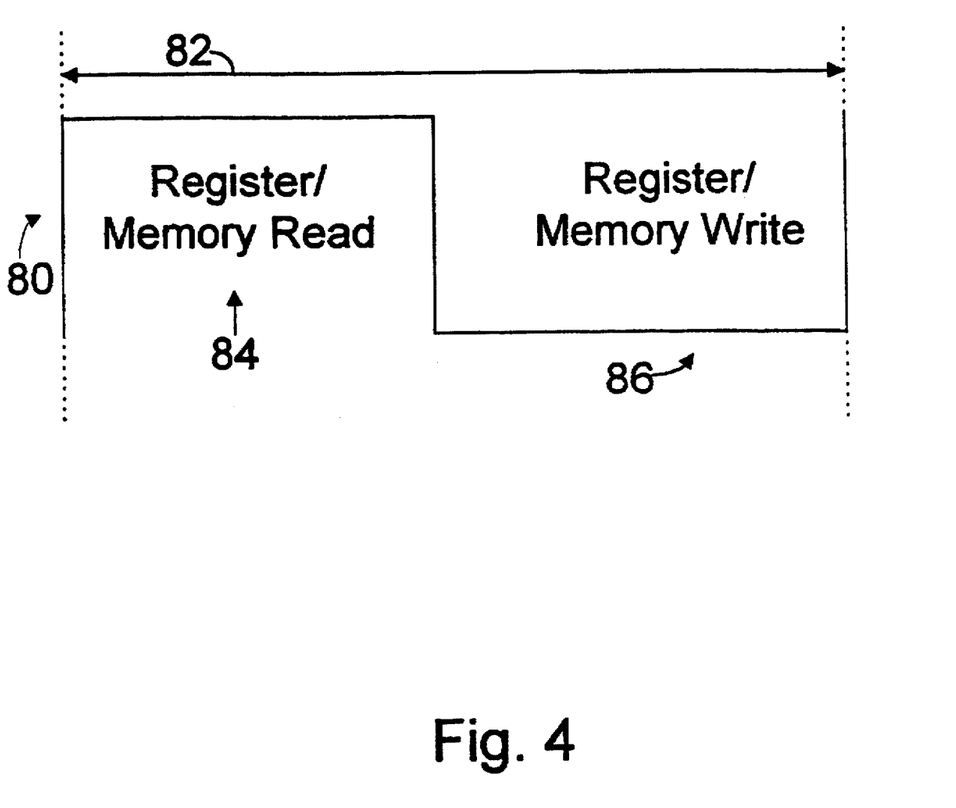
FIG. 4 is a diagram depicting a clock signal employed by the DSP shown in FIG. 2, illustrating reading and writing of a register file and memories included therein according to one embodiment of the DSP.

FIG. 4 depicts a clock signal 80 employed by one embodiment of DSP 40. One period of clock signal 80 defines a clock cycle within DSP 40, as indicated by the vertical dotted lines and arrow drawn there between (reference number 82). Register file 48 and first and second data memories 42 and 44 capture and provide values according to clock signal 80. In particular, register file 48 and first and second data memories 42 and 44 provide values from a particular storage location when clock signal 80 is in a logical high state (generally shown as reference number 84 in FIG. 4). Values are captured and stored into register file 48 and data memories 42 and 44 when clock signal 80 is in a logical low state (generally shown as reference number 86 in FIG. 4). Register file 48 and first and second data memories 42 and 44 may include latch structures for maintaining the values read from the storage locations during the logical low portion of clock signal 80, when those storage locations may be updated to a new value.

Figure 5:
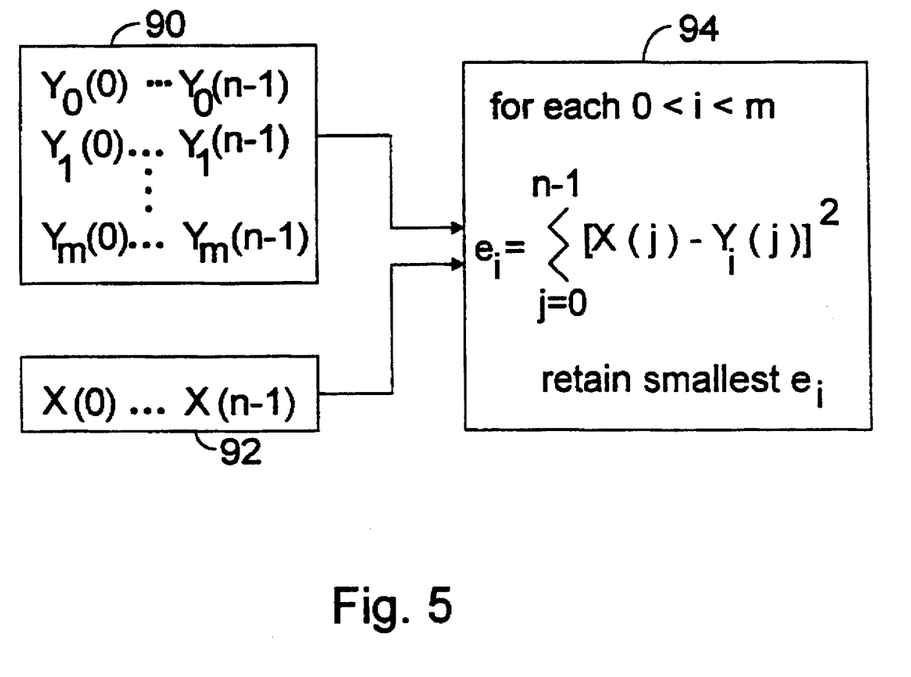
FIG. 5 is a diagram of an exemplary DSP operation.

Turning now to FIG. 5, an exemplary algorithm (or DSP operation) which may be performed by DSPs 10 and 40. The algorithm is common in speech compression applications, for example. An input vector X(0) through X(n−1), shown in box 92, is examined. The input vector may represent a segment of filtered speech uttered by a user of the computer system into which DSP 10 or 40 is configured, for example. The speech segment may first be filtered through a linear predictive coding filter, producing a residual (the input vector). The input vector is compared to a set of known vectors $Y_0$ through $Y_m$, shown in box 90. Each known vector includes the same number of elements as the input vector.

The known vectors are constant, representing known residuals, for example. The comparison is performed by subtracting each element of a particular known vector from the corresponding element of the input vector, and squaring the obtained difference. The squared differences corresponding to a particular known vector are summed. The smallest of the sums computed for each of the known vectors is saved. The sum may represent the difference between the known vector and the input vector, with larger numerical values indicating a larger difference between the input vector and the known vector. Therefore, the known vector associated with the numerically smallest sum may be selected as the most likely match to the input vector. The index (e.g. 0 through m) may be conveyed to a receiving device having the same set of known vectors $Y_0$ through $Y_m$. The receiving device may thereby reproduce the residual detected according to the algorithm illustrated in box 94. When used in speech compression applications, the number of vector elements (n) is typically in the range of 40–160 and the number of known vectors (m) is typically on the order of 1024–4096.

Figure 6:
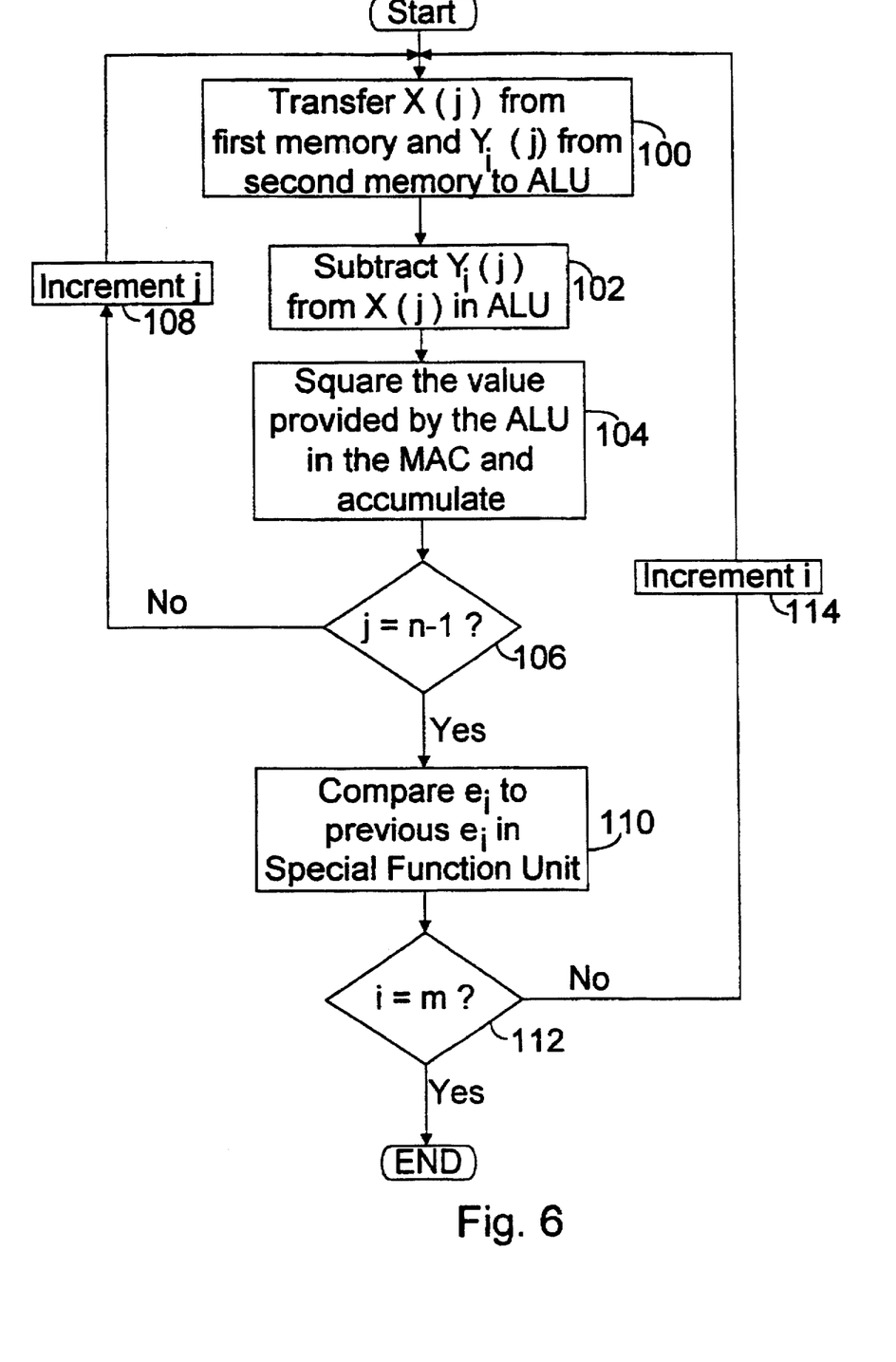
FIG. 6 is a flowchart depicting the operations performed by the DSPs shown in FIGS. 1 and 2 in order to perform the operation shown in FIG. 5.

FIG. 6 is a flow chart depicting the operation of DSPs 10 and 40 ("the DSP") when implementing the algorithm shown in FIG. 5. For the discussion of FIG. 6, reference numbers of elements of DSPs 10 and 40 will be omitted for brevity. Steps 100, 102, and 104 describe the operation of the DSP for each element of the vectors being operated upon. The input vector is stored in the first data memory within the DSP, while the known vectors are stored in the second data memory. The first data memory may be configured with sufficient storage for storing the input vector, such that each storage location is accessed once during the comparison of the input vector to a particular known vector. Addressing for the first data memory may be employed in a circular memory fashion such that, upon access to the last element in the input vector and subsequent increment of the address, the address reverts to the first element in the input vector. Similarly, the second data memory may include sufficient storage for the known vectors. The known vectors may be arranged in contiguous memory locations within the second memory such that, subsequent to accessing the last element of a particular known vector and incrementing the address, the address identifies a succeeding storage location storing the first element of another known vector.

As shown in step 100, an element of input vector X and the corresponding element of known vector $Y_i$ are transferred from the first and second memories, respectively. The elements are transferred to the ALU. The ALU subtracts the element of $Y_i$ from the corresponding element of X (step 102). The result produced by the ALU is conveyed to the MAC unit. The MAC unit receives the result as both of its input operands, thereby producing a product equal to the square of the ALU result. The MAC unit accumulates the square of the ALU result with the squares of the other differences corresponding to the present known vector (step 104).

Decision box 106 determines whether differencing and squaring the input vector and the current known vector is complete. If the operations of steps 100–104 have been repeated "n" times (i.e. j=n−1), then the vector is complete. If the operations of steps 100–104 have not been repeated "n" times yet, then another iteration of the operations of steps 100–104 is performed. As represented by step 108, the addresses of the first and second data memories are incremented to access the next consecutive storage locations. It is noted that "n" refers to the number of elements included within each vector.

Although shown in FIG. 6 as a series of serial steps, it is noted that the steps may be pipelined such that a second iteration of the steps may begin prior to a first iteration of the steps completing. For example, once the values are transferred from the first and second data memories as depicted in step 100, the addresses indicating memory locations to be transferred next may be incremented (step 108) and the next values may be conveyed to the ALU while the ALU performs step 102. Similarly, the ALU may perform step 102 upon a second pair of vector elements while the MAC unit is performing step 104 upon a first pair of vector elements.

When steps 100–104 have been performed upon each element of the input vector and corresponding elements of one of the known vectors, the MAC unit transmits the accumulated sum to the special functional unit. As depicted by step 110, the special functional unit compares the accumulated sum ($e_j$) to the numerically smallest of the previously generated $e_i$ (from previous iterations of steps 100–104 upon input vector X and known vector $Y_i$). The smaller numerical value between the current accumulated sum and the numerically smallest is saved for further comparison. Additionally, an indication of which known vector $Y_i$ which corresponds to the smallest numerical $e_i$ is stored.

Decision box 112 depicts the determination of whether or not each of the known vectors (shown in box 92 in FIG. 5) have been processed. If each vector has been processed, then the smallest numerical $e_i$ of the known vectors has been computed. Processing may continue with additional groups of known vectors, or the algorithm may be complete. If each of the known vectors within the current group has not been accessed, an internal counter indicative of the current known vector number is incremented (step 114), and the iteration of steps 100–104 begins again. It is noted that steps 110–114 may be pipelined with the beginning of steps 100–108 for the next known vector as well.

Figure 7:
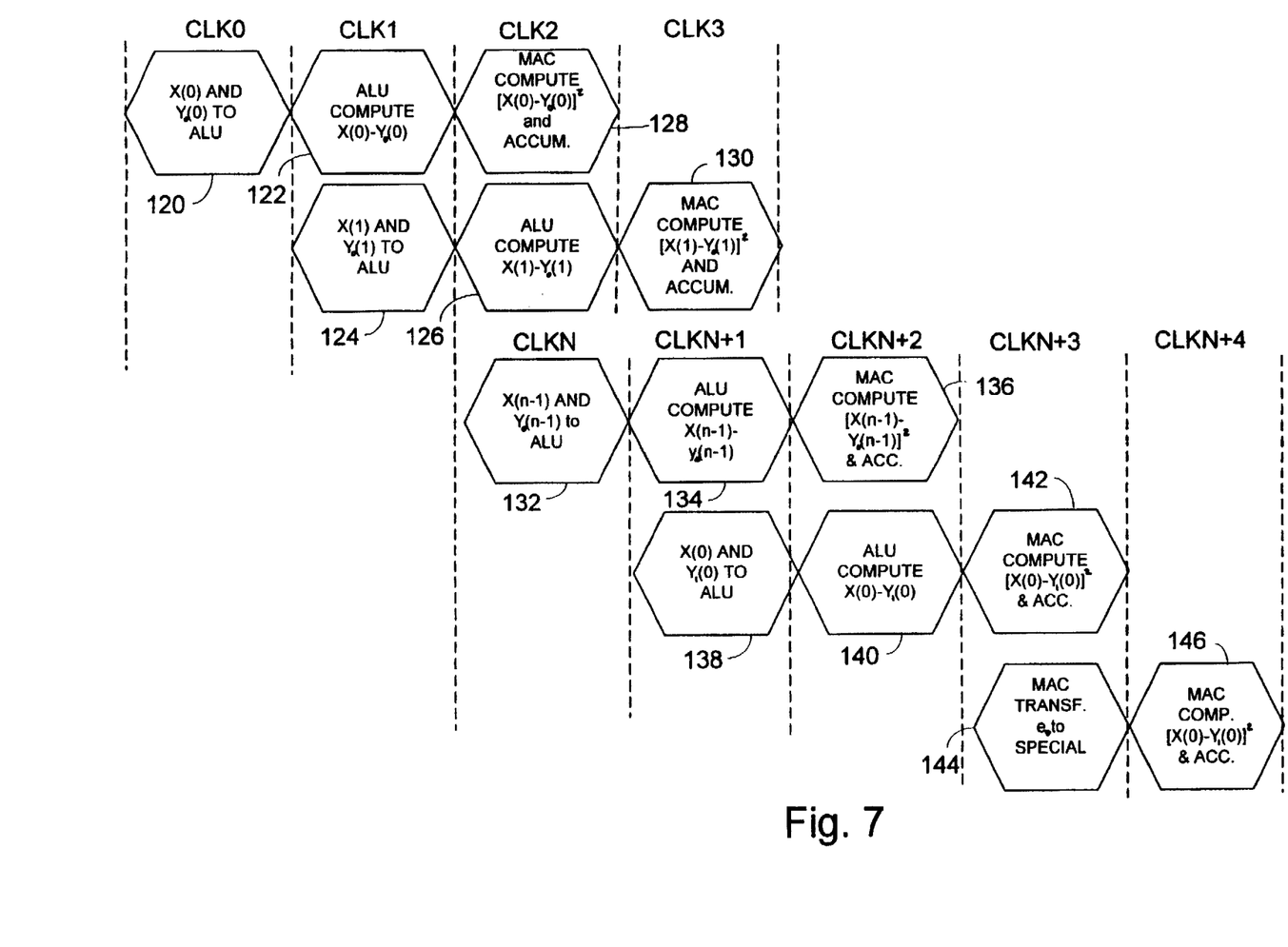
FIG. 7 is a timing diagram depicting events within the DSP shown in FIG. 1 when performing the operation shown in FIG. 5.

Turning next to FIG. 7, a timing diagram is shown. The timing diagram depicts the events of the flow chart shown in FIG. 6 as performed by DSP 10, shown in FIG. 1. Clock cycles are delimited by vertical dashed lines, and each clock cycle is labeled. Consecutive clock cycles CLK0, CLK1, CLK2, and CLK3 are shown. Additionally, consecutive clock cycles CLKN, CLKN+1, CLKN+2, CLKN+3, and CLKN+4 are shown. Clock cycle CLKN may not be consecutive to clock cycle CLK3. For simplicity in the discussion of FIGS. 7 and 8, various units of DSPs 10 and 40 will be referred to as performing various actions. In accordance with the description of FIGS. 1 and 2, units of DSPs 10 and 40 perform activities in response to control signals from instruction sequencers 12 and 46, respectively.

During clock cycle CLK0, the vector elements X(0) and $Y_0$(0) are conveyed from first and second data memories 14 and 16, respectively (block 120). Data memory buses 24A and 24B are employed for performing this transfer. ALU 18 receives the vector elements and computes the difference X(0)−$Y_0$(0) during CLK1 (block 122). The result is stored into output register 28 for conveyance to MAC unit 20. Concurrently, first and second data memories 14 and 16 convey the vector elements X(1) and $Y_0$(1) upon data memory buses 24A and 24B (block 124). ALU 18 receives the conveyed values and stores them into input registers 26A and 26B for computation during clock cycle CLK2 (block 126).

ALU 18 conveys the difference X(0)−$Y_0$(0) from output register 28 upon result bus 30 during clock cycle CLK2. MAC unit 20 receives the difference and squares the difference (block 128 The squared difference is accumulated by MAC unit 20 in its output register. During clock cycle CLK3, ALU 18 again uses the result bus to convey the difference $X(1)-Y_0(1)$ to MAC unit 20. MAC unit 20 squares the received difference and accumulates the squared difference with previously calculated squared differences (block 130).

Together, blocks 120-130 perform steps 100-104 of the flow chart shown in FIG. 6 upon the first two elements of the input vector X and the known vector $Y_0$. Because MAC unit 20 is accumulating the result of steps 100-104, only ALU 18 employs result bus 30 for transferring values between the functional units of DSP 10 during performance of steps 100-104. Additional elements of the vectors may be processed in a similar fashion, at the rate of one vector element computation beginning during each consecutive clock cycle.

During clock cycle CLKN, DSP 10 begins processing the last elements of the input vector X and the known vector $Y_0$ (i.e. element n-1). Blocks 132, 134, and 136 depict the performance of steps 100-104 upon $X(n-1)$ and $Y_0(n-1)$. Additionally, during clock cycle CLKN+1, first and second data memories convey $X(0)$ and $Y_1(0)$ to ALU 18 (block 138). It is desirable, for maximum performance, to perform the difference calculation $X(0)-Y1(0)$ during clock cycle CLKN+2 and the computation of the square of the difference during clock cycle CLKN+3 (dashed blocks 140 and 142). In other words, maximum performance within DSP 10 would be achieved if the processing of a new known vector could begin in a pipelined fashion with the end of processing the current known vector, such that a vector element computation begins each clock cycle.

Although the difference computation may be performed by ALU 18 during clock cycle CLKN+2, the difference may not be conveyed to MAC unit 20 during clock cycle CLKN+3. During clock cycle CLKN+3, MAC unit 20 takes control of result bus 30 in order to convey the accumulated square of differences value to special functional unit 22 (block 144). ALU 18 and first and second data memories 14 and 16 must stall their pipelines for a clock cycle. MAC unit 20 may then receive the difference from ALU 18 during clock cycle CLKN+4 (block 146). Unfortunately, a clock cycle is added to the total number of clock cycles needed to perform the algorithm depicted in FIG. 6. If, for example, 1024 known vectors are searched, then 1024 stall clock cycles are included in the total number of clock cycles needed to perform the algorithm. Performance of DSP 10 upon the algorithm shown in FIG. 6 is correspondingly affected adversely. As compared to the desirable pipeline flow in which another vector computation begins each clock cycle, performance of DSP 10 is decreased. The desirable pipeline flow is desired even when beginning new computations upon a known vector $Y_{i+1}$ while concurrently completing computation upon a known vector $Y_i$.

Figure 8:
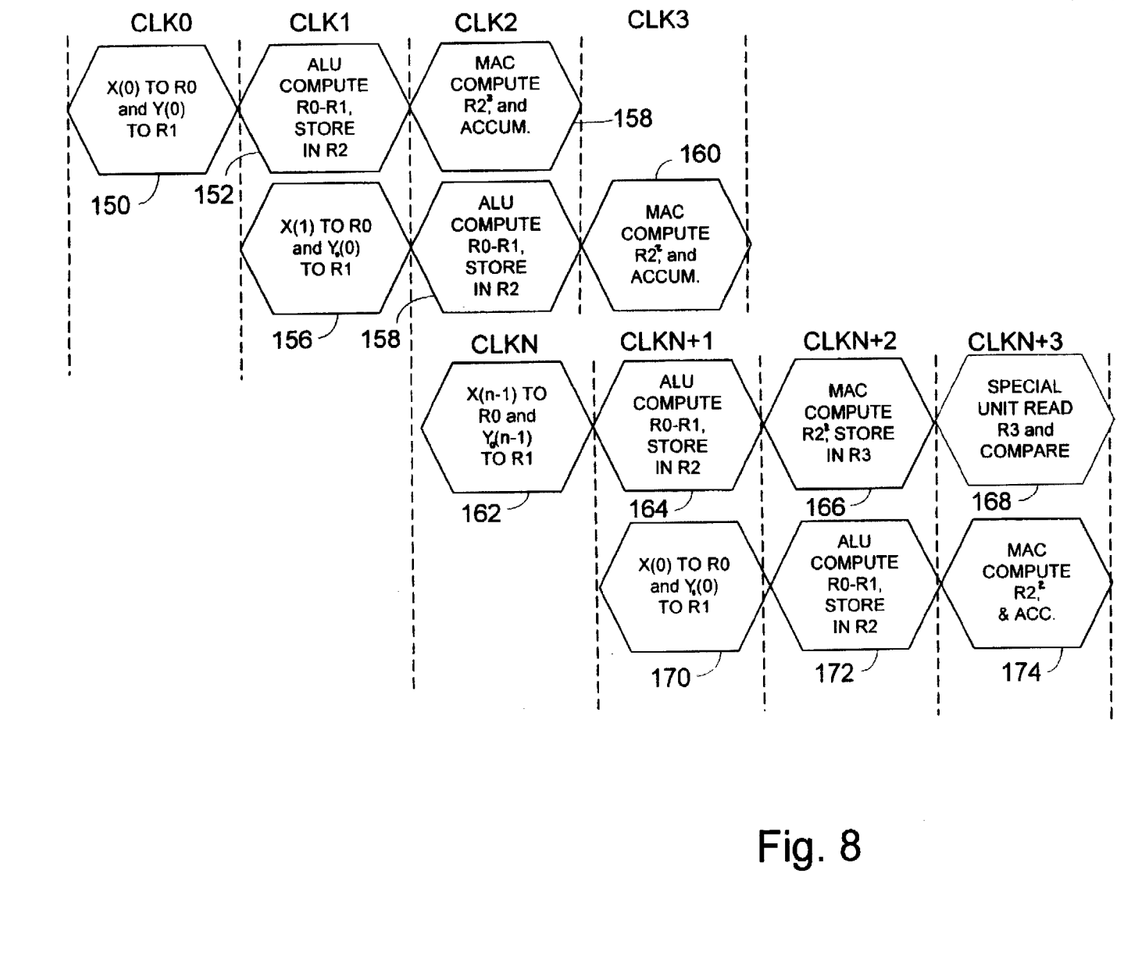
FIG. 8 is a timing diagram depicting events within the DSP shown in FIG. 2 when performing the operation shown in FIG. 5, according to one embodiment of the DSP.

Conversely, FIG. 8 depicts a timing diagram showing events upon the flow chart of FIG. 6 when DSP 40 performs the algorithm. Similar to FIG. 7, FIG. 8 depicts clock cycles delimited by vertical dashed lines. Consecutive clock cycles CLK0, CLK1, CLK2, and CLK3 are shown. Additionally, consecutive clock cycles CLKN, CLKN+1, CLKN+2, and CLKN+3 are shown. Clock cycle CLKN may not be consecutive to clock cycle CLK3.

Similar to DSP 10, DSP 40 is capable of beginning a new vector element computation each consecutive clock cycle, as depicted by blocks 150-160. Block 150 represents the beginning of computation upon vector elements $X(0)$ and $Y_0(0)$ during clock cycle CLK0. During clock cycle CLK1, block 156 represents the beginning of computation upon vector elements $X(1)$ and $Y_0(1)$. However, instead of first and second data memories 42 and 44 conveying data directly to ALU 50, first and second data memories 42 and 44 convey data to register file 48. Register addresses zero and one, may be assigned to store vector elements conveyed by first and second data memories 42 and 44. R0 and R1 represent register storage locations identified by register addresses zero and one, respectively. Data memories 42 and 44 store $X(0)$ and $Y_0(0)$ into R0 and R1 during clock cycle CLK0, and store $X(1)$ and $Y_0(1)$ into R0 and R1 during clock cycle CLK1 after ALU 50 has read $X(0)$ and $Y_0(0)$ therefrom. It is noted that any register addresses may be assigned to these and other values, as long as unique register addresses are assigned to each unique value described herein.

Register R2 is assigned to the result of ALU 50's difference computation R0-R1. Each clock cycle, ALU 50 computes a difference and stores the result in register R2. For example ALU 50 stores the difference $X(0)-Y_0(0)$ into R2 during clock cycle CLK1 (block 152). Additionally, ALU 50 stores the difference $X(1)-Y_0(1)$ into R2 during clock cycle CLK2 (block 158). MAC unit 52 reads register R2 each clock cycle. Register R2 is conveyed to MAC unit 52 as both of its input operands. The value read is thereby squared and stored into either accumulator register 58 or R3 within register file 48. For example, MAC unit 52 computes the square of the difference $X(0)-Y_0(0)$ during clock cycle CLK2 and the difference $X(1)-Y_0(1)$ during clock cycle CLK3 (blocks 154 and 160). Additional vector elements may be computed during subsequent clock cycles using a similar pipelining of operations to that shown in clock cycles CLK0-CLK3 of FIG. 8.

Clock cycles CLKN, CLKN+1, CLKN+2, and CLKN+3 are additionally depicted in FIG. 8. During these clock cycles, DSP 40 reaches the last element of vectors X and $Y_0$, (i.e. $X(n-1)$ and $Y_0(n-1)$). Blocks 162, 164, and 166 depict the performance of steps 100, 102, and 104 upon $X(n-1)$ and $Y_0(n-1)$. As noted in block 166, MAC unit 52 stores the accumulated result of squared differences of the elements of input vector X and corresponding elements of known vector $Y_0$ into register R3 during clock cycle CLKN+2. During clock cycle CLKN+3, special functional unit 54 reads register R3 and performs the compare and retain smallest numerical value function described above (block 168). Register R4 may be used to store the smallest numerical value computed by special functional unit 54, and may be conveyed as an input operand such that repeated compare and retain smallest numerical value computations may be performed for subsequent known vectors $Y_i$.

During clock cycle CLKN+1, first and second data memories 42 and 44 store the vector elements $X(0)$ and $Y_1(0)$ into registers R0 and R1 (block 170). As depicted by block 172 in clock cycle CLKN+2, ALU unit 50 computes the difference $X(0)-Y_1(0)$ and stores the result in register R2. During clock cycle CLKN+3, MAC unit 52 computes the square of the value stored in R2, accumulating the result in either accumulator register 58 or R3 within register file 48 (block 174).

As opposed to the timing diagram shown in FIG. 7 in which a clock cycle of stall in the pipeline of the operations corresponding to the algorithm is experienced between processing of each known vector $Y_i$, DSP 40 continues to perform calculations at the rate of one calculation beginning each clock cycle. This rate is achieved even though processing of the last elements of a known vector $Y_i$ (including compare and retain smallest numerical value computations) and processing of another known vector $Y_{i+1}$ are overlapped in the pipeline. Block 170 is the beginning of a calculation corresponding to known vector $Y_1$, and additional computations may begin at a rate of one per clock cycle thereafter. Advantageously, the individual communication paths between the functional units and register file 48 enable the pipelining of operations through DSP 40 more efficiently than the efficiency achievable in DSP 10. Still further, the multiple registers within register file 48 may be employed by any unit during a particular application. In stark contrast, the input and output registers in DSP 10 (e.g. reference numbers 26A, 26B, and 28) are assigned to particular functional units and are not available for use by other functional units. Essentially, register file 48 provides a buffer between first and second data memories 42 and 44 and the functional units of DSP 40. The buffer provides storage locations which may be used by an algorithm encoded into DSP 40 to prevent pipeline disruption during performance of the algorithm.

It is noted that, between the completion of computation upon a known vector $Y_i$ and the beginning of computation upon a subsequent known vector $Y_{i+1}$, the accumulated result stored by the MAC unit must be zeroed in order to begin accumulating the sum of the squares of the differences between input vector X and known vector $Y_{i+1}$. A control signal may be included between the instruction sequencer and the MAC unit for forcing the accumulated result to zero. Typically, the control signal forces the accumulated result being added into the multiplication result produced by the MAC unit to zero. The instruction sequencer may assert the control signal when the MAC unit is squaring the first difference of the subsequent known vector (i.e. $X(0)-Y_{i+1}(0)$), such that the first squared difference is added to zero and stored into the accumulated result.

It is noted that the present discussion refers to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

In accordance with the above disclosure, a DSP having a register file coupled between a plurality of memories and a plurality of functional units is disclosed. The register file allows multiple results to be provided during a clock cycle, increasing performance of the DSP over conventional DSPs employing a shared result bus structure.

Numerous variations and modifications will become apparent to those skilled in the art once the above disclosure is fully appreciated. It is intended that the following claims be interpreted to embrace all such variations and modifications.

What is claimed is:

1. A digital signal processor, comprising:

an ALU (Arithmetic Logic Unit) configured to perform at least one arithmetic and logical instruction operation upon a first plurality of data conveyed thereto;

an MACU (Multiply and Accumulate Unit) configured to perform a multiply and accumulate instruction operation upon a second plurality of data conveyed thereto;

at least one special function unit configured to perform a specific predetermined instruction operation upon a third plurality of data conveyed thereto;

a register file including a plurality of storage locations, wherein each of said plurality of storage locations is configured to store data, and wherein said register file is coupled to provide said first, second and third pluralities of data to said ALU, said MACU and said at least one special function unit respectively, and wherein said register file is coupled to receive a result from each of said ALU, said MACU and said at least one special function unit and to store said result into one of said plurality of storage locations, and wherein each of said plurality of storage locations is further configured to be concurrently accessible by any of said ALU, said MACU and said at least one special function unit;

a plurality of memories coupled to said register file to facilitate a first data transfer therebetween, and wherein a second data transfer between said plurality of memories and said ALU, said MACU and said at least one special function unit is via placement of said data into said register file for access thereto by an intended recipient of said data; and an instruction sequencer coupled to said ALU, said MACU, said at least one special function unit, said plurality of memories and said register file, wherein said instruction sequencer is configured to convey a plurality of control signals in response to a plurality of instructions to effectuate simultaneous data transfers between said register file and said ALU, said MACU and said at least one special function unit and also between said plurality of memories and said register file, wherein said instruction sequencer is further configured to perform dependency checking among said plurality of instructions to ensure correct sequence of instruction execution, and wherein said instruction sequencer is further configured to detect completion of a vector computation in said MACU and to convey one of said plurality of control signals to said MACU in response thereto, wherein said vector computation generating an accumulated result and said accumulated result being stored within said MACU, and wherein said one of said plurality of control signals forcing said accumulated result stored within said MACU to zero after transferring said accumulated result to said register file.

2. The digital signal processor as recited in claim 1, wherein said MACU is modified to perform a multiply instruction operation only, and wherein said MACU is further modified to utilize one of said plurality of storage locations within said register file as an accumulator register.

3. The digital signal processor as in claim 1, wherein said register file is configured to support a read-before-write protocol for said second data transfer between said plurality of memories and said ALU, said MACU and said at least one special function unit.

4. The digital signal processor as recited in claim 1, wherein said instruction sequencer is further configured to store said plurality of instructions, wherein at least one of said plurality of instructions is configured to modify a plurality of memory addresses stored within said instruction sequencer to generate a plurality of modified memory addresses for a plurality of subsequent instructions, and wherein at least one of said plurality of control signals conveyed by said instruction sequencer includes said plurality of modified memory addresses to effectuate said first data transfer between at least one of said plurality of memories and said register file.

5. The digital signal processor as recited in claim 1, further comprising a plurality of special function units, wherein at least one predetermined group of special function units from said plurality of special function units is provided a non-concurrent access to said each of said plurality of storage locations in said register file.

* * * * *